US012723738B2

(12) United States Patent
Sales

(10) Patent No.: US 12,723,738 B2
(45) Date of Patent: *Sep. 1, 2026

(54) SOURCE-MATCHED DIFFUSER FOR LOW SPECKLE ILLUMINATION

(71) Applicant: VIAVI SOLUTIONS INC., Chandler, AZ (US)

(72) Inventor: Tasso R. M. Sales, Rochester, NY (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/967,307

(22) Filed: Dec. 3, 2024

(65) Prior Publication Data

US 2025/0093015 A1 Mar. 20, 2025

Related U.S. Application Data

(63) Continuation of application No. 18/358,831, filed on Jul. 25, 2023, now Pat. No. 12,163,658.

(60) Provisional application No. 63/394,127, filed on Aug. 1, 2022.

(51) Int. Cl.
*F21V 7/00* (2006.01)

(52) U.S. Cl.
CPC .................................... *F21V 7/00* (2013.01)

(58) Field of Classification Search
CPC ........... F21V 5/00–048; F21V 7/00–30; G02B 3/0037–0068; G02B 5/02–0294; G02B 27/48; G02F 1/133602–133613
See application file for complete search history.

(56) References Cited

U.S. PATENT DOCUMENTS

| | | | | |
|---|---|---|---|---|
| 6,859,326 | B2 * | 2/2005 | Sales | G02B 3/005 359/619 |
| 7,918,583 | B2 * | 4/2011 | Chakmakjian | F21V 5/04 362/240 |
| 9,620,688 | B2 | 4/2017 | Lee et al. | |
| 11,125,413 | B2 | 9/2021 | Hanashima et al. | |
| 11,726,237 | B2 | 8/2023 | Arima et al. | |
| 2008/0043466 | A1 | 2/2008 | Chakmakjian et al. | |
| 2009/0257106 | A1 | 10/2009 | Tan et al. | |
| 2013/0100525 | A1 | 4/2013 | Chiang et al. | |
| 2014/0183571 | A1 | 7/2014 | Lee et al. | |
| 2018/0198254 | A1 | 7/2018 | Tatum et al. | |
| 2019/0353831 | A1 | 11/2019 | Seki et al. | |

(Continued)

FOREIGN PATENT DOCUMENTS

| | | |
|---|---|---|
| CN | 213814260 U | 7/2021 |
| CN | 113900168 A | 1/2022 |

(Continued)

OTHER PUBLICATIONS

Japanese Patent Office, "Including English translation of Notice of Reasons for Refusal for Japanese Application No. 2023-125325", dated Apr. 8, 2025, 8 pages.

(Continued)

*Primary Examiner* — Jason M Han
(74) *Attorney, Agent, or Firm* — Mannava & Kang, P.C.

(57) ABSTRACT

A diffuser is disclosed. A system comprising a light source and a diffuser is disclosed. The light source is aligned with a microlens of the diffuser in a static configuration. A method of reducing speckle with the system is also disclosed.

14 Claims, 4 Drawing Sheets

(56) References Cited

U.S. PATENT DOCUMENTS

| | | | |
|---|---|---|---|
| 2020/0006920 | A1 | 1/2020 | Padullaparthi et al. |
| 2021/0026047 | A1 | 1/2021 | Greiner et al. |
| 2021/0337172 | A1 | 10/2021 | Kanasugi et al. |

FOREIGN PATENT DOCUMENTS

| | | | |
|---|---|---|---|
| JP | 2002026452 | A | 1/2002 |
| JP | 2005175417 | A | 6/2005 |
| JP | 2015169804 | A | 9/2015 |
| JP | 2018522264 | A | 8/2018 |
| JP | 2019523895 | A | 8/2019 |
| JP | 2020532141 | A | 11/2020 |
| JP | 2022546623 | A | 11/2022 |
| KR | 1020100009943 | A | 1/2010 |
| TW | 201643473 | A | 12/2016 |

OTHER PUBLICATIONS

Korean Intellectual Property Office, “Including English translation for Notice to Submit Response for Korean Application No. 10-2023-0099737”, mailed Apr. 22, 2025, 8 pages.

Sales Tasso, “Bandlimited Illumination with engineered diffusers”; Advanced Optical Technologies, vol. 1, No. 3, Jul. 2, 2012, pp. 127-134.

English translation of “Notice of Reason for Refusal” for Japanese Application No. 2023-125325, dated Aug. 20, 2024, 14 pages.

Korean Intellectual Property Office, “Including English translation of Notice to Submit Response for Korean Application No. 10-2023-0099737”, dated Dec. 16, 2025, 8 pages.

* cited by examiner

SOURCE-MATCHED DIFFUSER FOR LOW SPECKLE ILLUMINATION

RELATED APPLICATION

This application is a Continuation of commonly assigned and co-pending U.S. patent application Ser. No. 18/358,831, filed Jul. 25, 2023, which claims priority from U.S. provisional application No. 63/394,127 filed on Aug. 1, 2022, the disclosures of both of which applications are herein incorporated by reference in their entireties.

FIELD OF THE INVENTION

The present disclosure generally relates to a diffuser matched to a light source array to provide illumination with reduced speckle.

BACKGROUND OF THE INVENTION

Some light source arrays, such as vertical-cavity surface emitting lasers (VCSEL), when combined with beam-shaping diffusers produce speckle, the granular appearance of the light distribution, highly noticeable when the source is sufficiently coherent. This graininess is objectionable in some applications.

While speckle is unavoidable in illumination with coherent sources, the grainy appearance it produces can be visually objectionable or limit performance in some sensing applications. In the so-called fully developed speckle, one observes 100% contrast variation in the distribution of light making the speckle pattern very distinct. In some applications where the presence of speckle is detrimental, eliminating or sufficiently minimizing speckle contrast is of great interest. Speckle can be produced by a sufficiently coherent source illuminating a beam shaping element, such as a diffuser. Speckle can also be observed upon illumination of a rough surface, but we focus here on those cases where a diffuser is the main source of the speckle pattern.

An effective method of reducing speckle can be to introduce motion of the source with respect to the diffuser. In particular, as the beam moves across the diffuser the statistical distribution of speckles changes. If the motion is sufficient to generate multiple instances of independent speckle patterns, an averaging effect takes place that reduces the speckle contrast and, over some appropriate integration time, the image appears uniform. Other approaches involving motion can also make use of multiple diffusers moving with respect to each other to produce the desired averaging effect. Another factor that can help reduce speckle contrast is broad spectrum illumination although not typically as effective as motion.

Although motion can be used as an effective method of rendering the grainy appearance of speckle less disturbing, it also introduces added complexity to the optical system as well as requiring more space for its implementation. In some cases, this may be an acceptable compromise but in others it cannot be tolerated. In those cases, options for reducing speckle contrast are limited or at times non-existent. At a fundamental level, speckle is the result of interference and diffraction as a beam is transmitted through a diffuser. (The same phenomenon can be observed upon reflection from a diffuser or generally rough surface.) The details and nature of the diffusing surface can affect the statistical properties of the speckle pattern but invariably one finds the typical grainy appearance so long as the source is sufficiently coherent.

What is needed is a system, in a static configuration, for reducing speckle, comprising a light source, and a diffuser. The light source can comprise multiple emitters that are individually coherent but substantially mutually incoherent.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1:
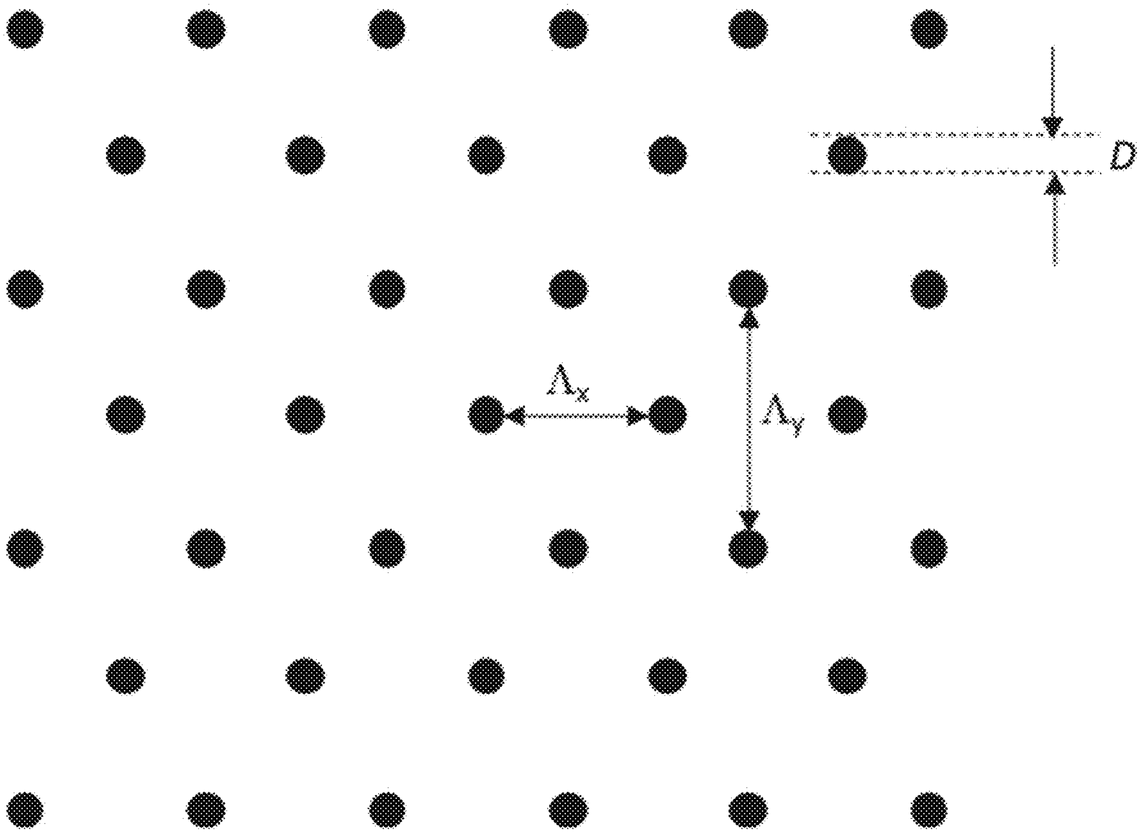
FIG. 1 is a section of a light source, according to an aspect of the invention.

In an aspect, there is disclosed a diffuser comprising a random distribution of microlenses, wherein each microlens includes a scattering unit.

In another aspect, there is disclosed a system including a light source; and the diffuser.

In another aspect, there is a method of using a system, comprising emitting light from a light source, wherein the light source is aligned with a microlens of a diffuser; and receiving the emitted light in the aligned microlens of the diffuser; wherein the system is in a static configuration.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. Additionally, any reference to "top", "bottom", "right", and/or "left" are intended to provide relative physical relationships and is not intended to be limiting.

In its broad and varied embodiments, disclosed herein is a diffuser, a light source, and a system including the diffuser and the light source. A method of using the system (in a static configuration) can result in a reduced speckle pattern as compared to a system (in a dynamic configuration).

A light source 12 can be a plurality of light sources, such as an array. Each light source 12 can be individually coherent. The plurality of light sources 12 can be substantially mutually incoherent. In an aspect, the light source 12 can be a VCSEL array comprising hundreds of individual light emitters, with each emitter providing coherent laser illumination, and the plurality of emitters can be mutually incoherent. For example, a first light source 12*a*, of an array, can propagate through a diffuser 14 and produce a first speckle pattern that is statistically independent from a second light source 12*b*, of the array that propagates through the diffuser 14 and produces a second speckle pattern. The first and second speckle pattern add together, not in complex amplitude, but in intensity.

The light source can be mounted on a substrate.

FIG. 1 illustrates a portion of a VCSEL array in which each black dot represents an individual light source 12. Each light source 12 can be characterized by a diameter D. The array of light sources 12 can be characterized by other parameters that specify its periodicity. The plurality of light sources 12 can be arrayed in a variety of configurations, such as a hexagonal configuration or a random configuration. The hexagonal configuration, shown in FIG. 1, can be defined by the periodicity parameters $\Lambda_x$ and $\Lambda_y$.

The main reason coherent illumination leads to speckle is because the light source 12 emits a beam 22 that can illuminate multiple scatter units within a diffuser 14. The diffuser 14 can include a scatter unit that can spread light by changing its amplitude and phase in a unique way. For example, complex amplitudes from multiple scatter units can combine to give rise to a strong modulation observed in a speckle pattern. It should be noted that other types of diffusers, not necessarily composed of microlenses, can also be used.

Figure 2:
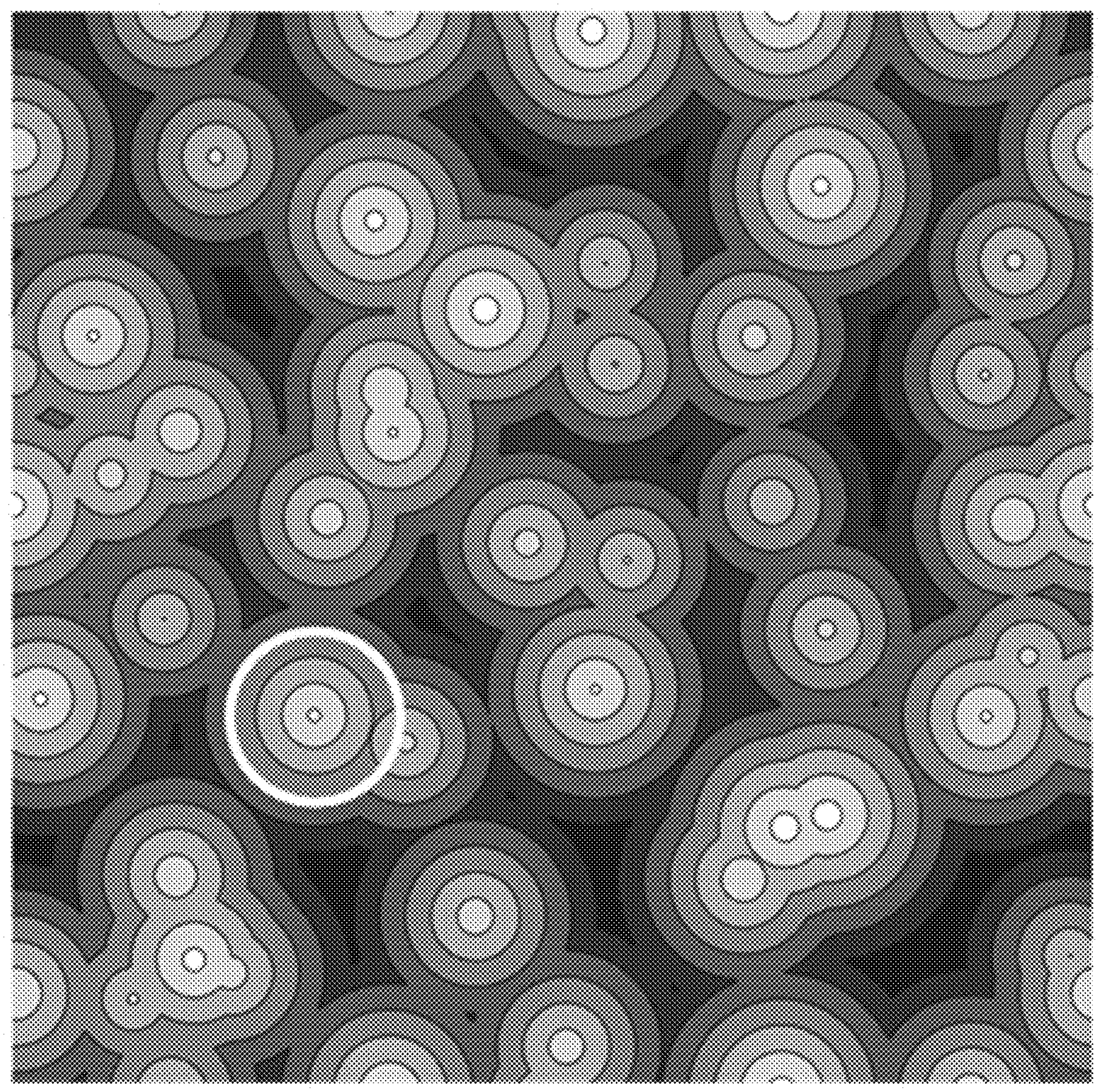
FIG. 2 is a section of a surface of diffuser, according to an aspect of the invention.

A diffuser 14 can comprise a random distribution of microlenses 16, wherein each microlens 16 includes a scattering unit, such as an elementary scattering unit. Each scattering unit can be randomly distributed across a surface (first 18, second 20) of the diffuser 14 at different scales. FIG. 2 illustrates a contour model of a surface of a diffuser 14. An exemplary scatter unit is indicated within the white circle.

Figure 3:
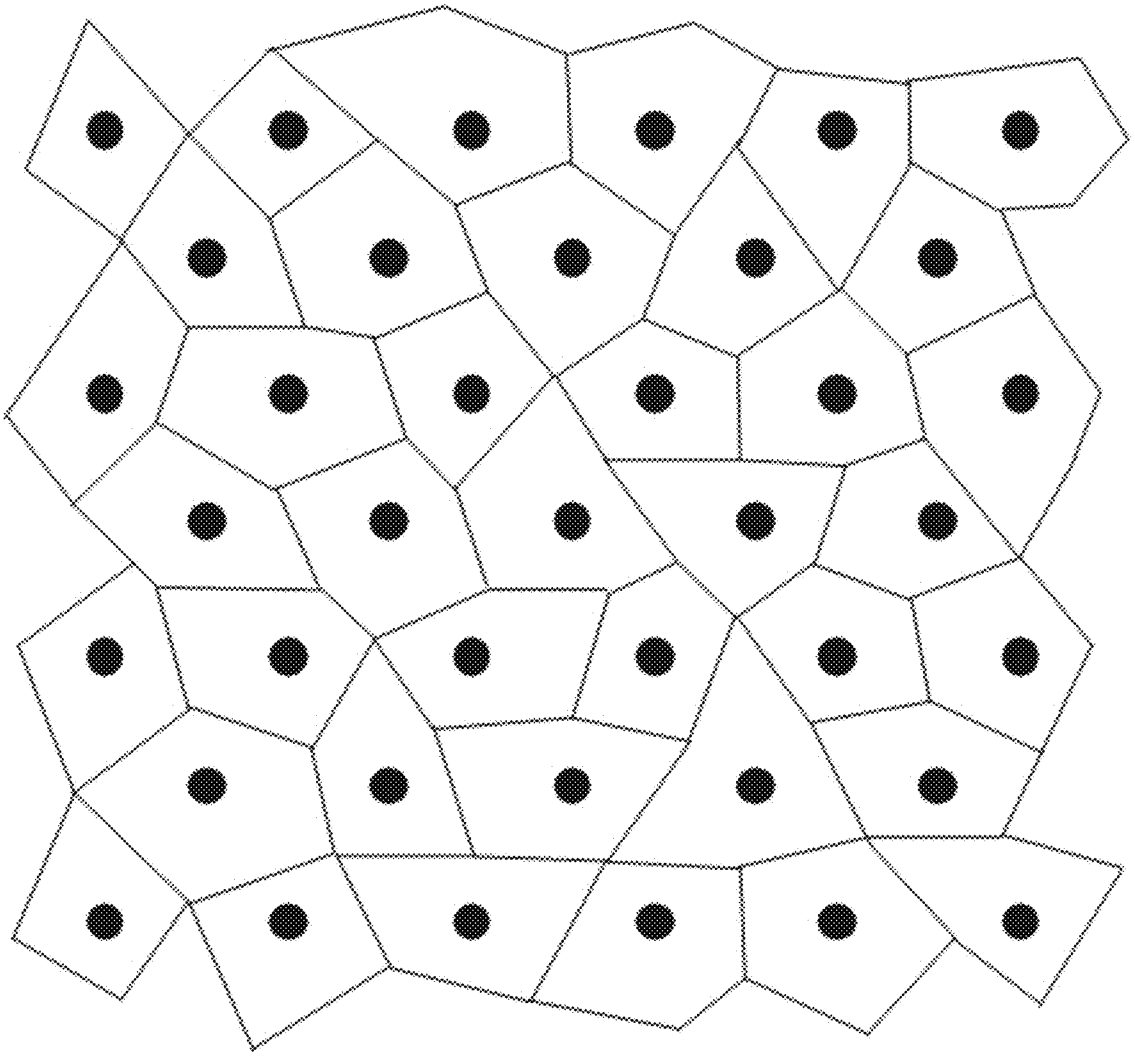
FIG. 3 is an illustration of the light source matched with boundaries of the diffuser, according to an aspect of the invention.

A system 10 can include the light source 12 and the diffuser 14. Each light source 12 can associate with a single microlens 16 of the diffuser 14. In this manner, interference effects caused by illumination of multiple microlenses 16 can be eliminated or substantially reduced. FIG. 3 shows where each microlens 16 is indicated by the polygonal lines surrounding each light source 12, here represented by the black dots. In general, the boundary of each microlens 16 does not have to be defined by a polygonal curve and can instead assume a general form, with curved/straight segments and/or continuous/discontinuous shape. The light source 12 array can be the same hexagonal grid shown in FIG. 1. Within each microlens 16 domain, there is defined a surface profile characterized by slopes that spread the light beam 22 from its associated light source 12 away from the microlens 16. Because each light source 12 can be substantially associated with a single microlens 16, interference from multiple microlenses 12 can be absent and the resulting speckle contrast can be minimal. A boundary shape associated with any given light source 12 can assume a variety of forms. The boundary shapes associated with any two given light sources 12 can be distinct. In addition, the sag profiles within said boundary shapes of the microlens 16 can also be distinct. An overall randomized distribution of boundary shapes and sag profiles can be used over a periodic arrangement to avoid the emergence of image artifacts, such as moiré fringing.

In the light system 10, a diffuser 14 should be matched (e.g., aligned) with a beam 22 of light from the light source 12. A distance between the light source 12 and a first surface 18 of the diffuser 14 can be controlled. Some adjustment in the distance can be allowed if the light emitted 22 from the light source 12 remains mostly constrained to illuminate substantially one microlens 16 of the diffuser 14. If the distance become significant, multiple microlenses 16 could be illuminated by a single light source 12 and speckle contrast could increase.

Figure 4A:
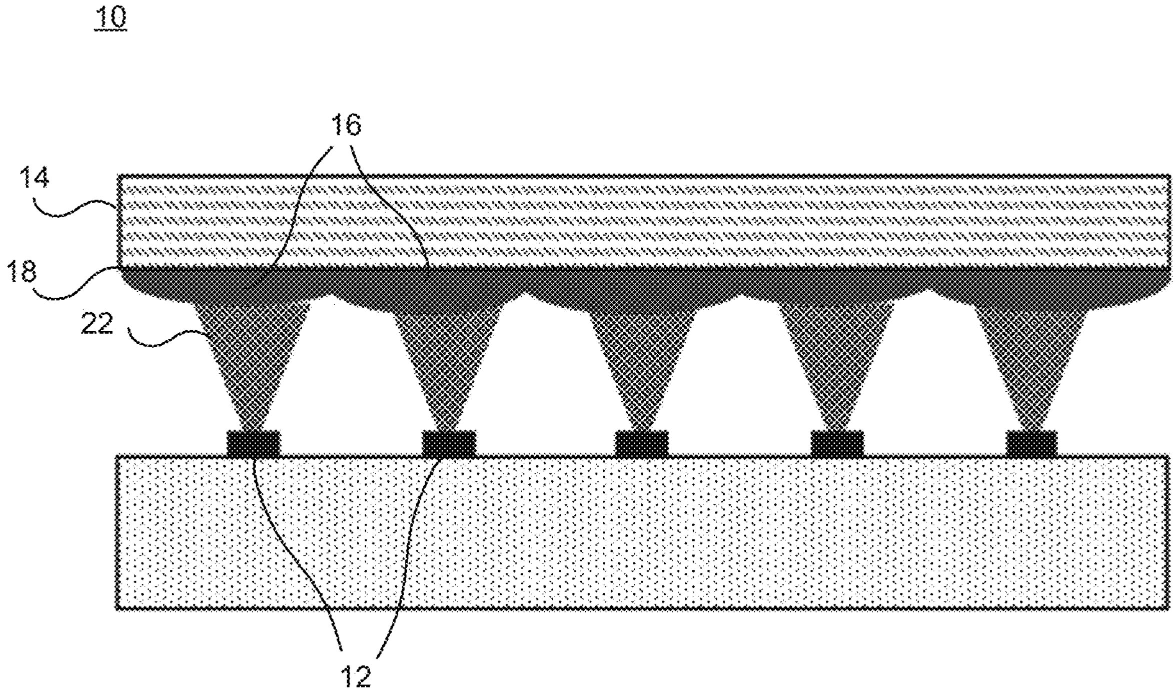
FIG. 4A illustrates a schematic cross-sectional view of a system according to an aspect of the invention.
Figure 4B:
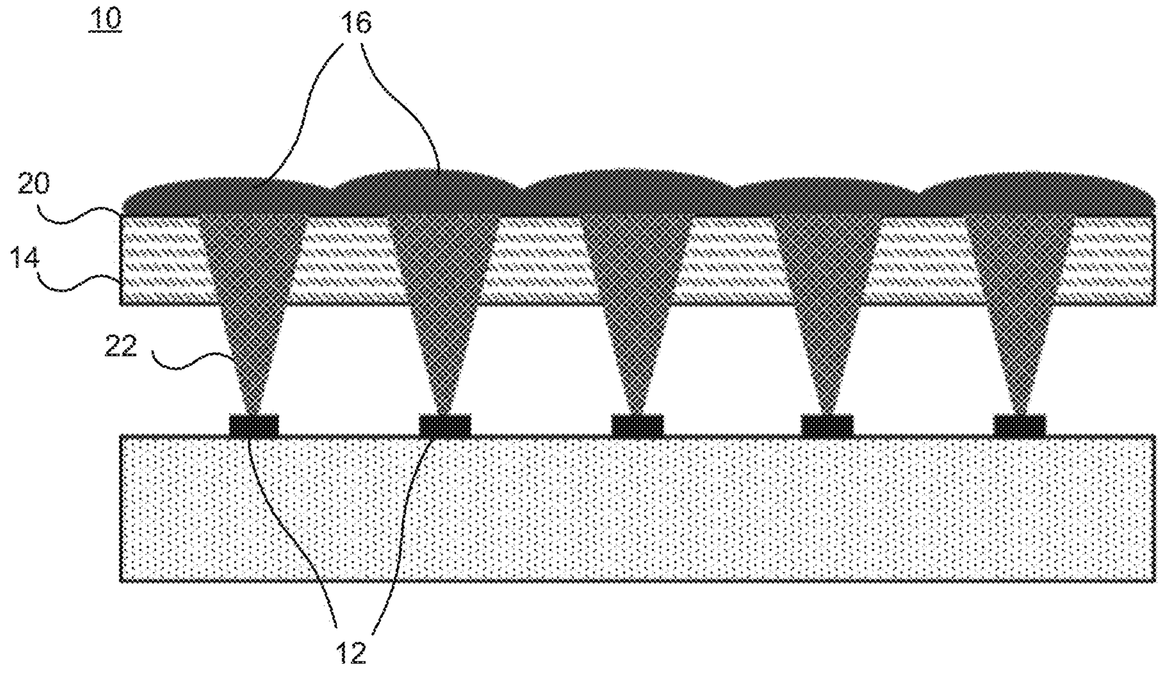
FIG. 4B illustrates a schematic cross-sectional view of a system according to another aspect of the invention.

FIG. 4A illustrates a light system 10 including a light source 12, such as a plurality of light sources, and a diffuser 14. The diffuser 14 has a microlens 16, such as a plurality of microlenses. Each light source 12 can be aligned with a microlens 16 of the diffuser 14. The light source 12 can emit a light beam 22 incident on the aligned microlens. As shown in FIG. 4, the microlenses 16 of the diffuser 14 can be present on a first surface 18, wherein the first surface 18 can be directed towards the light source 12 of the light system 10. As shown in FIG. 4B, the microlenses 16 of the diffuser 14 can be present on a second surface 20, wherein the second surface 20 can be directed away from the light source 12 of the light system 10.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A system comprising:

a plurality of light sources in an ordered arrangement with respect to each other; and a diffuser comprising a distribution of microlenses present on a surface of the diffuser, wherein the microlenses have boundary shapes at the surface of the diffuser that are randomly distributed among the microlenses across the surface of the diffuser;

wherein each light source of the plurality of light sources is aligned with and is to illuminate a single microlens of the distribution of microlenses during operation of the system, and wherein the system is in a static configuration.

2. The system of claim 1, wherein each light source, of the plurality of light sources, is individually coherent.

3. The system of claim 1, wherein the plurality of light sources are mutually incoherent.

4. The system of claim 1, wherein the microlenses are present on a first surface of the diffuser oriented towards the plurality of light sources.

5. The system of claim 1, wherein the microlenses are present on a second surface of the diffuser oriented away from the plurality of light sources.

6. The system of claim 1, wherein the microlenses have sag profiles and wherein a sag profile of a microlens is characterized by slopes that are configured to spread a light beam from an associated light source away from the microlens.

7. The system of claim 1, wherein the microlenses have randomly distributed polygonal boundary shapes at the surface of the diffuser.

8. The system of claim 1, wherein the plurality of light sources are arranged in a hexagonal configuration.

9. A method of using a system, comprising:

emitting light from a plurality of light sources that are in an ordered arrangement with respect to each other, wherein each light source of the plurality of light sources is aligned with a single corresponding microlens of a plurality of microlenses of a diffuser, wherein the plurality of microlenses have boundary shapes at a surface of a diffuser and wherein the boundary shapes are randomly distributed among the plurality of microlenses across the surface of the diffuser; and receiving the emitted light from a single light source of the plurality of light sources in the corresponding microlens of the plurality of microlenses of the diffuser;

wherein the system is in a static configuration.

10. The method of claim 9, wherein each light source, of the plurality of light sources, is individually coherent.

11. The method of claim 9, wherein the plurality of light sources are mutually incoherent.

12. The method of claim 11, wherein the diffuser comprises a random distribution of microlenses.

13. The method of claim 9, wherein the plurality of microlenses are randomly distributed across a surface of the diffuser at different scales.

14. The method of claim 9, wherein the plurality of light sources are arranged in a hexagonal configuration.

* * * * *